United States Patent [19]

Domeneghini

[11] Patent Number: 5,303,807
[45] Date of Patent: Apr. 19, 1994

[54] ELECTROHYDRAULIC DEVICE FOR CONTROLLING THE ENGAGEMENT OF THE CLUTCH IN MOTOR VEHICLES AND THE LIKE

[75] Inventor: Fabio Domeneghini, Marcon Venezia, Italy

[73] Assignee: Fadiel Italiano S.R.L., Italy

[21] Appl. No.: 793,371

[22] PCT Filed: Jul. 2, 1990

[86] PCT No.: PCT/EP90/01057
§ 371 Date: Jan. 3, 1992
§ 102(e) Date: Jan. 3, 1992

[87] PCT Pub. No.: WO91/00441
PCT Pub. Date: Jan. 10, 1991

[30] Foreign Application Priority Data

Jul. 4, 1989 [IT] Italy ................... 84137 A/89

[51] Int. Cl.⁵ ............................................ F16D 23/12
[52] U.S. Cl. ................. 192/0.076; 192/0.033; 192/103 F
[58] Field of Search .......... 192/0.076, 103 F, 0.096, 192/0.033, 85 C

[56] References Cited

U.S. PATENT DOCUMENTS

| | | | |
|---|---|---|---|
| 3,738,460 | 6/1973 | Murakami et al. | 192/3.58 |
| 4,200,175 | 4/1980 | Dick | 192/0.033 |
| 5,131,514 | 7/1992 | Machida | 192/103 F X |
| 5,135,091 | 8/1992 | Albers et al. | 193/85 C |

FOREIGN PATENT DOCUMENTS 0254483 1/1988 European Pat. Off. .
3306519 9/1983 Fed. Rep. of Germany .

Primary Examiner—Leslie A. Braun
Assistant Examiner—Andrea Pitts
Attorney, Agent, or Firm—Hofman, Wassen & Gitler

[57] ABSTRACT

An electrohydraulic device for controlling clutch engagement in motor vehicles and the like, incorporating a hydraulic actuator having the rod of its piston connected to the clutch lever, a hydraulic circuit for controlling the hydraulic actuator via an interceptor mechanism, an electronic control unit which causes the interceptor mechanism to feed the hydraulic actuator and thereby cause clutch release, as well as to enable the hydraulic actuator to discharge, and at least one solenoid valve connected to the discharge circuit of the hydraulic actuator which is caused to open by the electronic control unit due to a sequence of electronic pulses related to the rotational speed of the vehicle engine. The command to the interceptor mechanism is provided by the electronic control unit automatically when predetermined engine operating conditions exist or by the action of the driver. A control hydraulic actuator, is situated between the interceptor mechanism and the hydraulic actuator, downstream of a relative piston. The relative piston involves an opposing spring for adjusting its working stroke according to the engagement stroke of the clutch. A line is communicatively interposed between the hydraulic circuit connecting the hydraulic actuator and an outer hydraulic circuit which acts when the clutch is in the engagement position.

25 Claims, 6 Drawing Sheets

ELECTROHYDRAULIC DEVICE FOR CONTROLLING THE ENGAGEMENT OF THE CLUTCH IN MOTOR VEHICLES AND THE LIKE

BACKGROUND OF THE INVENTION

1. Field of the Invention

This invention relates to an electrohydraulic device for controlling the engagement of the clutch in motor vehicles and the like.

In motor vehicles, the clutch is generally controlled by a pedal which by overcoming the reaction of one or more springs causes the clutch plate, rigid with the main gearbox shaft, to separate from the flywheel, which is rigid with the crankshaft (clutch disengaged). On releasing the pedal the elastic reaction of the previously loaded springs prevails to again bring the plate into contact with the flywheel, so restoring their torsional connection (clutch engaged).

To provide a servo-control for both clutch release and engagement, and thus make clutch control easier and quicker, and particularly suitable for invalids without the use of a lower limb, it has been proposed to utilize the vacuum of the engine when in operation.

Specifically, the clutch lever is provided with a switch for controlling one or more solenoid valves, which use the engine vacuum to control the clutch operation. In practice the driver has merely to operate the gear lever in order to automatically disengage and then re-engage the clutch thereby.

Although this known method solves the general clutch servo-control problem, it has certain limits and drawbacks, and in particular:

its action is not totally reliable under all conditions. In particular, when the engine is idling (for example in queues) it is unable to create the necessary vacuum for repeated clutch operation;

if the engine should accidentally stall (for example when maneuvering or because of low temperature) there may not be sufficient vacuum to release the clutch and thus disengage the gear;

there is a certain delay in its action, which in some situations can make the vehicle difficult to control. This is particularly the case in the so-called "pavement-window test", in which the front of a vehicle faces a pavement step, beyond which there is an obstacle such as a window. the need to bring the engine up to high speed to enable the vehicle to climb the step means that the clutch cannot be immediately released after this climb in order to halt the vehicle before collision with the obstacle. A further example in which the negative consequences of a delay in the release of the clutch are evident is in automobile competitions, in which this delay obliges "short" entry into a bend (i.e. with anticipated gear change), which can result in precious fractions of a second lost;

unsmooth and insensitive control, in that the clutch engagement is practically uncontrollable by the driver, being totally dependent on vacuum control, and smooth, slow movements such as those generally required when parking or when close to obstacles are not possible.

2. Discussion of the Prior Art

Control systems of hydraulic or electromagnetic type have also been studied. These have however been used up to the present time only in experimental form on racing vehicles and with considerable operational limitations.

DE-A-3 306 519 discloses a hydraulic actuator for controlling clutch engagement and release, a hydraulic circuit for controlling the actuator via an interceptor, an electronic control unit to control the interceptor to feed the hydraulic actuator to thus cause clutch release, and to enable the actuator to discharge, one or more solenoid valves connected into the discharge circuit of the hydraulic actuator and caused to open by the control unit by a sequence of pulses related to the rotational speed of the vehicle engine. The command to the interceptor for feeding the hydraulic actuator is provided by the control unit automatically when predetermined engine operating conditions exist, and/or by the action of the driver.

EP-A-0 254 483 discloses a fluid pressure regulator valve comprising a linear solenoid that acts on an asymmetric spool valve to selectively communicate one port with another to thereby regulate fluid pressure.

SUMMARY OF THE INVENTION

An object of the invention is to allow very rapid and reliable clutch engagement even under the most demanding operating conditions in which satisfactory results have not so far been obtained, i.e. in competition vehicles.

A further object of the invention is to provide a device which enables this control to be effected even by invalids without the use of a lower limb.

A further object of the invention is to provide a device which can also be applied to mass-produced vehicles.

A further object of the invention is to provide a device of substantially universal type, which can be very easily but at the same time accurately adapted to motor vehicles of any type.

These and further objects will be apparent from the description given hereinafter.

BRIEF DESCRIPTION OF THE DRAWINGS

A preferred embodiment of the present invention is described hereinafter with reference to the accompanying drawings in which.

DETAILED DESCRIPTION OF THE PREFERRED EMBODIMENT

Figure 1:
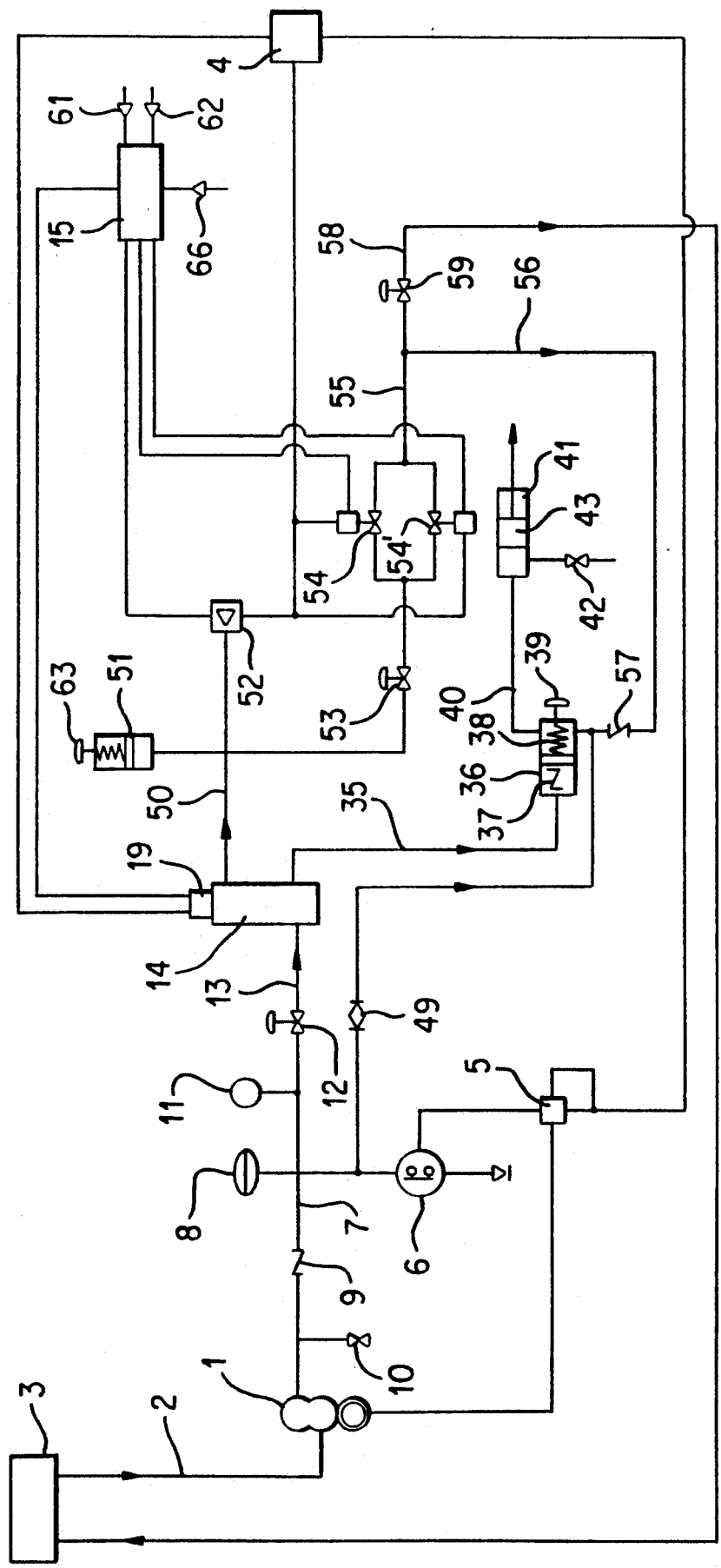
FIG. 1 is a general electrohydraulic schematic of the slide valve according to the invention.

As can be seen from the figures, the device according to the invention comprises an electrically operated pump connected by a line 2 to a reservoir 3 and powered by a battery 4 via a relay 5 controlled by a pressure switch 6, which ensures that a predetermined pressure is maintained in the circuit 7. This pressure can be set on the pressure switch.

The clutch control pedal 133 of the motor vehicle 131 can be actuated by the foot of the operator or driver 130. The wheels 132 of the vehicle 131 are operably connected to the vehicle engine 134 via a clutch assembly, in the well-known manner. Clutch levers 136 serve to mechanically link the clutch control pedal 133 to the engaging and disengaging elements of the clutch assembly.

The circuit 7 also comprises a pressure accumulator 8 the purpose of which is to keep the circuit 7 under pressure downstream of the pump 1, this circuit comprising a non-return valve 9 and a bleed valve 10. Downstream of the non-return valve 9 there is a pressure indicator 11 and a flow reducer 12, preferably of self-controlled type, the purpose of which is to regulate the rate of release of the clutch. A line 13 connects the flow reducer 12 to a slide valve 14 which is controlled by a control unit 15 and powered by the battery 4.

The slide valve 14 comprises a metal body 16 longitudinally traversed by a cylindrical cavity 17 housing a cylindrical rod 18 in an axially guided and sealed manner. This rod is connected at one end to an electromagnet 19 which operates axially under the control of the control unit 15 and is also provided with a counteracting spring 20 which returns the rod to its opposite end-of-travel position (see FIG. 3) in the absence of intervention by said electromagnet 19.

Both the end-of-travel positions of the rod 18 are defined by mechanical stops incorporated in the electromagnet 19.

Two pairs of coaxial ducts 21 and 21' and coaxial ducts 22 and 22' provided in the body 16 open in diametrically opposite positions into the cylindrical cavity 17.

One duct 21 and 22' of each pair is internally threaded to receive a threaded, axially bored bush 23 and 24 comprising a widely flared portion 25 at the outer end of the axial bore. The threaded bush 23 and 24 is screwed into the corresponding threaded portion of the respective duct 21 and 22' and is also provided with a conventional seal ring 26.

Those ducts opposite the ducts 21 and 22', i.e. the ducts 21' and 22, each house a bushing 27 and 27' externally comprising longitudinal grooves and retained axially by a metal ring 28, elastically inserted into a suitable seat in the relative duct. Each bushing 27 and 27' houses the rounded end 29 of a guide pin for a small spring 30 which, after passing through a diametrical slot 31 and 32 in the rod 18 keep a small ball 33 and 34 elastically adhering to the flare portion 25 of the facing bushing 23 and 24.

The two through slots 31 and 32 in the rod 18 are flared in the sense that their length, measured along the rod axis, is less at the end facing the balls 33 and 34 whereas it is greater at the other end, facing the bushing 27 and 27'. In addition, the distance between the axes of the two slots 31 and 32 is slightly less than the distance between the axes of the two pairs of axial ducts 21 and 21' and 22 and 22'.

Finally, while the three ducts 12', 22 and 22' open on the outside of the body 16 in suitable seats for connection to external pipes, the duct 21 opens into the duct 22, the external circuit 13 being connected to the duct 21'.

A line 35 is connected from the duct 22 of the slide valve 14 to a cylinder 36 comprising a non-return valve 37. Downstream of its piston, the cylinder 36 is provided with a spring 38 and an adjustment screw 39. That part of the cylinder 36 downstream of the relative piston is connected via a circuit 40 to a clutch control cylinder 41. The cylinder 41 is provided with a bleed valve 42.

The cylinder 41 houses a piston 43, the rod 44 of which is connected to the clutch operating lever (not shown).

Specifically, the piston 43 and its rod 44 comprise an axial bore 45 which opens into a recess 46 in the piston 43. The axial bore 45 and the recess 46 are traversed by a cable 47 to which a cylindrical holdfast 48 which can be tightly received in the recess 46 is applied. One end of the cable 47 is connected to the clutch operating lever, whereas its other end is connected to the clutch operating pedal. In this manner, as will be apparent hereinafter, the pull on the cable 46 for releasing the clutch can be applied independently either by the pedal or by the piston 43.

The circuit 7 is also connected via a valve 49 to that region of the cylinder 36 downstream of the relative piston. Also connected to the duct 22' of the slide valve 14 there is a circuit 50 which terminates in an accumulation cylinder 51 and a pressure sensor 52, which enables the operation of the control unit 15 only when a predetermined pressure is reached in the circuit 50. A flow control valve 53, preferably of self-controlled type, is also connected into the circuit 50.

Downstream of the flow control valve 53 there are two solenoid needle valves 54 and 54', connected in parallel into a discharge circuit 55 and controlled by the electronic control unit 15. They are adjustable in terms of their opening time by the control unit 15, and in terms of their throughput by an adjustment screw. The two solenoid valves 54 and 54' are operated alternately, although in principle one solenoid valve would be sufficient.

From the discharge circuit 55 there extends a circuit 56 which via a non-return valve 57 discharges into that part of the cylinder 36 downstream of the relative piston, and a further circuit 58, which via an adjustable valve 59, returns the fluid into the reservoir 3.

As stated, the control unit 15 receives commands from the distributor (not shown), from a tachometer sensor 61, from a clutch control switch 62 and from the pressure sensor 52, and emits commands for the two needle solenoid valves 54 and 54, and for the electromagnet 19 of the slide valve 14. In the control unit a programmable memory (EPROM) is provided which as input receives pulses at a frequency related to the engine rotational speed and provides as output a train of pulses which via a conventional bistable circuit is divided into two alternate control sequences for opening the two needle solenoid valves 54 and 54'. As will be apparent hereinafter, the purpose of this programmable memory is to adapt the pulse train for controlling the bistable circuit, and hence the two control sequences for alternately opening the two needle solenoid valves 45 and 45', to the type of vehicle and to the engine load. Specifically, it is programmed to provide for the particular vehicle in which it is installed a response, in terms of pulses, which is related to the speed of rotation of the engine and hence to the drive torque available at the crankshaft, and possibly also related to the vehicle speed.

In describing the operation of the device according to the invention, it is convenient for clarity to start from an initial moment of rest, in which the clutch is in its released state.

Figure 3:
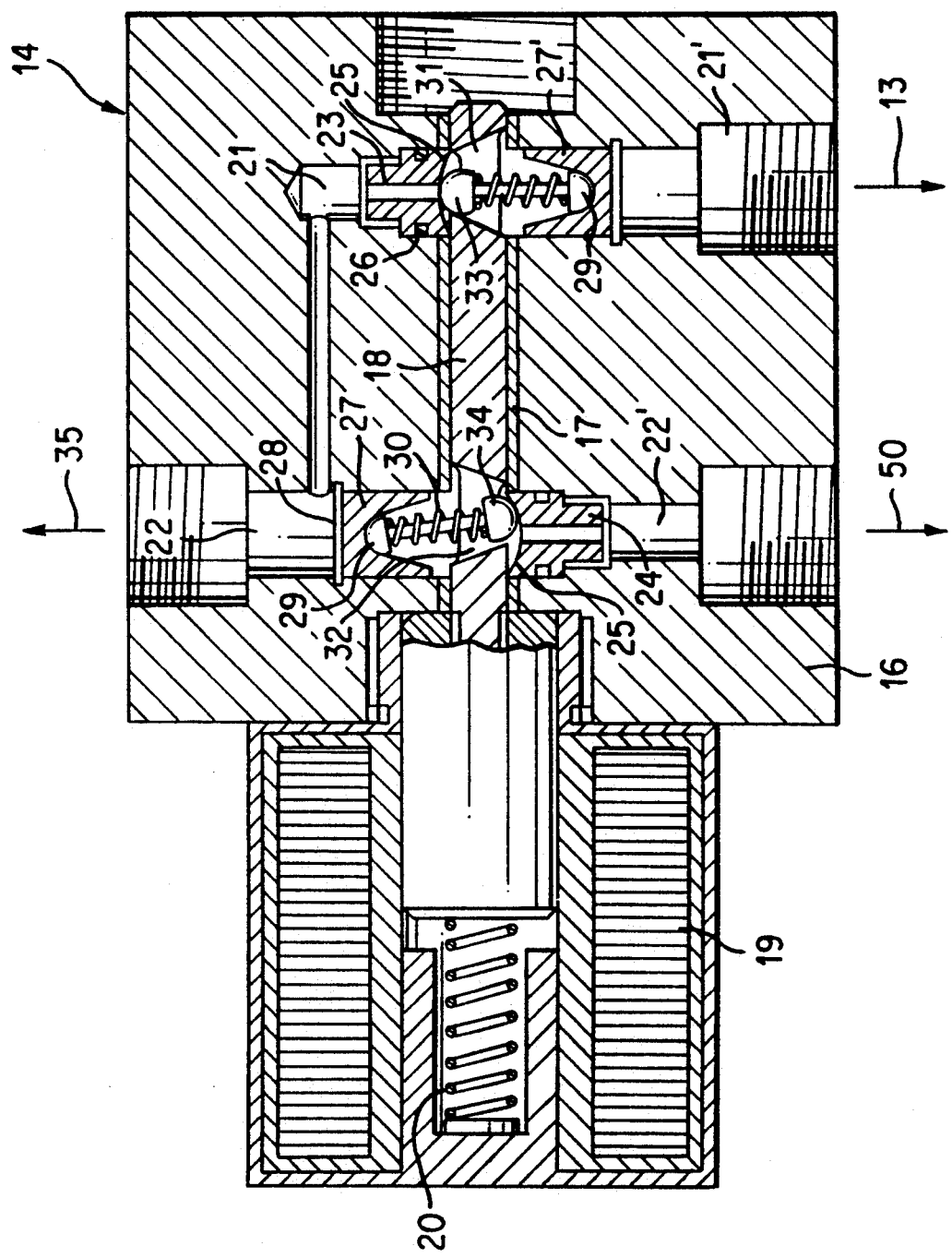
FIG. 3 shows the slide valve in the same view as FIG. 2, but with the clutch released.
Figure 4:
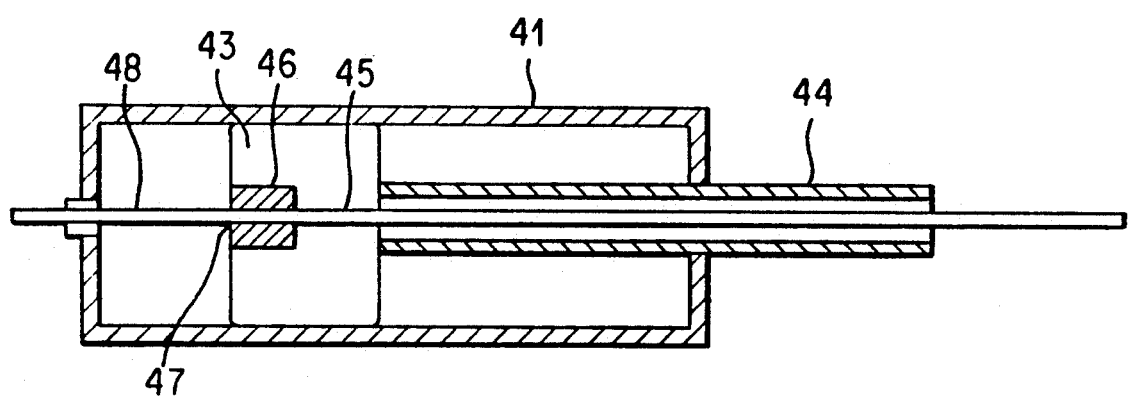
FIG. 4 is a schematic section through an actuator for controlling the clutch.

Under these conditions the electronic control unit 15 is deactivated, the electromagnet 19 is deactivated and the rod 18 of the slide valve 15 is in its end-of-travel position, held there elastically stable by the spring 20, i.e. in the position shown in FIG. 3.

In this state, the left hand wall of the slot 32 keeps the ball 34 slightly separated from the position in which it closes the axial bore of the bushing 24, which is therefore open, whereas the axial bore through the bushing 23 is closed by the relative ball 33 by virtue of the smaller distance between the axes of the slots 31 and 32 than between the pairs of ducts 21 and 21' and 22 and 22'. Thus the pressure in the circuit 13, which is connected to the duct 21', is not transmitted beyond the slide valve 14, whereas the circuit 35 is connected via the duct 22, the slot 32 and the duct 22' to the duct 44, and both are discharged.

Figure 2:
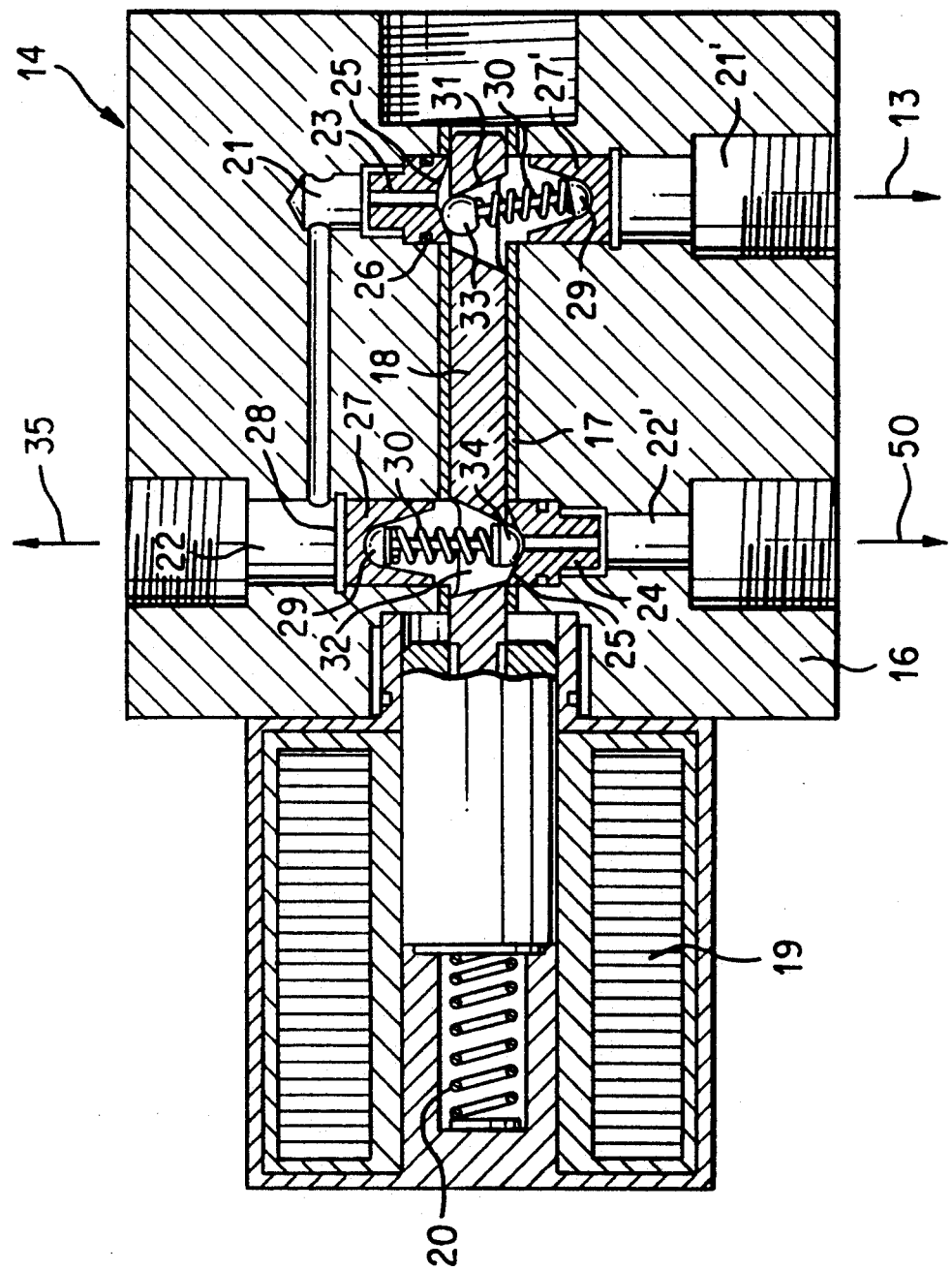
FIG. 2 is a longitudinal section through the slide valve used in the device of the invention with the clutch engaged.

Under these conditions, the pump 1, which is always powered by the battery 4 (although it could be powered via the ignition key on the dashboard, and thus only when the engine is in operation), ensures that there is always the predetermined pressure in the circuit 7. If the rotational speed of the engine falls below a threshold value programmed in the control unit 15 or if the switch 62, preferably incorporated into the handgrip on the gear level, is operated, the control unit 15 powers the electromagnet 19 of the slide valve 14, to move it axially into its opposite end-of-travel position (see FIG. 2).

In this case, as soon as the rod 18 commences its leftward movement, the left hand wall of the slot 32 moves to allow the ball 34 to descend along the flaring 25 of the corresponding bushing 24 until it closes its axial bore and hence the duct 22' and the external line 50 connected to it. During this initial portion of its travel, the rod 18 has practically no influence on the ball 33, because of the small clearance between the ball, which is in its closure position, and the right hand wall of the slot 31.

As its leftward travel continues, the rod 18 has no influence on the ball 34, which remains in its closure position because of the clearance between it and the right hand wall of the slot 32, whereas the ball 33 is urged by the right hand wall of the slot 31 into its open position.

Thus, the action of the control unit 15 has been to firstly close the circuit 50, and then connect the line 13 to the line 35 via the duct 21', the peripheral grooves on the bushing 27', the slot 31, the axial bore of the bushing 23, the duct 21 and the duct 22. By virtue of this connection, the pressurized oil from the circuit 13 can pass through the line 35 and reach the cylinder 36, to operate its piston by overcoming the elastic reaction of the opposing spring 38. The piston of the cylinder 36 itself urges the oil contained in the closed circuit 40 to operate the piston 43 of the cylinder 41, and thus to pull the cable 47, which is mechanically connected to the clutch lever and can thus release the clutch.

The same action is also possible via the clutch pedal, should the device of the invention be deactivated.

The adjustment screw 39 of the cylinder 36 allows the quantity of oil contained in the two cylinders 36 and 41 and in their connection circuit 40 to be varied, to thus vary the travel of the piston 43 in order to adapt the device practically to any motor vehicle.

The clutch release position is stable while no command reaches the slide valve 14. When it is required to re-engage the clutch it is necessary only to accelerate the engine so that when it reaches a predetermined speed, for example 1000 r.p.m., the control unit 15, which is sensitive to this rotational speed, transmits a deactivation command to the electromagnet 19 of the slide valve 14.

When the energization of this electromagnet ceases, the elastic reaction of the spring 20, which tends to move the rod 18 rightwards, prevails to thus firstly move the ball 33 into its closure position and then move the ball 34 into its open position, so interrupting the connection between the two circuits 13 and 35 and providing a connection between the circuit 35 and the circuit 50 via the duct 22, the peripheral grooves on the bushing 27, the slot 32, the axial bore through the bushing 24 and the duct 22'.

As soon as this connection has been made, the effect of the counterpressure of the clutch plate springs causes the piston 43 of the cylinder 41 to discharge the oil through the circuit 40 and into the cylinder 36, so that this feeds control oil to the circuit 50. The first part of the oil which reaches the circuit 50 collects in the accumulator 51, the purpose of which is to rapidly "absorb" the initial re-engagement travel of the clutch until the plate is just skating. An adjustment screw 63 on the accumulator 51 allows the device to be adapted to the particular vehicle on which it is to be installed.

As the oil continues to flow into the circuit 50, its pressure increases in this circuit until it reaches the value set on the sensor 46, which then activates the control unit 15.

The thus activated control unit fees command pulses to the two solenoid valves 54 and 54' to cause them to open alternately and thus allow for each opening phase a predetermined quantity of oil corresponding to the duration of the command pulse to pass. During this phase the flow control valve 53 is required to "flatten" the overpressure peaks which occur for each operation of a solenoid valve 54 and 54'. The control unit 15 will have been programmed to feed one pulse each time the engine increases its rotational speed by a predetermined amount (for example every 100 r.p.m.), so that the higher the rotational speed of the engine the closure together is the series of pulses and hence the more rapid the re-engagement of the clutch.

The rate at which these pulses are fed can be fixed, but is preferably related to the vehicle speed. In particular, the signal can be taken from the tachometer sensor 61 so that the higher the vehicle speed the faster the counting and thus the faster the clutch re-engagement.

Particularly in this case, a comparator is foreseen (not shown in the drawings) which compares the two electric signals related to the rotational speed of the crankshaft and of the wheels (preferably of the inner engine wheel which, being farrer from the edge of the road, is less subjected to probable skiddings) and according to such a comparison, varies, on the basis of a predetermined program memorized in the unit 15, the frequency of emission of controlling pulses for the valves 54 and 54'. In such a way it is allowed that, during a gear change, notwithstanding the decreased rotational speed of the motor due to the release of the clutch, it can occur the automatic re-engagement of the same and can be used the same braking effect of the motor.

In addition to this fast pulse count, there is also a slow count so that even if the engine does not attain the rotational speed corresponding to completion of the pulses within the predetermined time, all the pulses required for total clutch re-engagement are still reached.

The invention may also incorporate an integrator circuit 15', which processes signals related to the rotational speed of the engine, in order to properly control, the solenoid valves 54, 54', as intended. The integrator 15' circuit generates a sequence of pulse signals having a frequency related to the engine's rotational speed.

The purpose of the bleed valve 10 provided downstream of the pump 1 is to prime the pump on installation of the device.

The purpose of the valve 49 is, when open, to charge the circuit 40 which releases the clutch.

The non-return valve 57 is provided to automatically restore the oil in the circuit 40 and at the same time to prevent the oil going to discharge instead of into the cylinder 41 each time the cylinder 36 is operated.

The purpose of the bleed valve 42 is to allow the oil to be fed into the circuit 40 by utilizing the pressure of the circuit 7 on opening the charge valve 49.

The aforegoing description relates to normal installation and operating conditions. However, the device of the invention is also able to correctly perform its function even under abnormal situations outside usual working conditions.

For example, if during clutch re-engagement, i.e. when the oil is discharging through the solenoid valves 54 and 54', it suddenly becomes necessary to again release the clutch, new oil flows through the line 13 and into the line 35 to feed the cylinder 36, whereas the oil which had not completely discharged from the accumulation member 51 would not be able to discharge further because of deactivation of the control unit 15. However, in such a case the pressure still present in the circuit 50 is sensed by the sensor 46 and causes the control unit to simultaneously open the two solenoid valves 54 and 54' for immediate discharge of the oil.

Again, if the electromagnet 19 should accidentally burn out, the spring 20 returns the rod 18 to its rest position (see FIG. 3), and in this case the oil in the circuit 35 is compelled to discharge through the slide valve 14 to the circuit 50 and into the accumulator 51, but cannot further discharge because the solenoid valves 54 and 54' downstream are closed. A skating condition therefore prevails, which can be easily controlled by the brake.

Again, should the solenoid valves 54 and 54' develop a fault, the springs with which they are provided keep them in their closed state, and the fact that the oil cannot therefore discharge, means that it becomes impossible to re-engage the clutch. Thus any uncontrolled forward movement of the vehicle is again prevented.

From the aforegoing it is apparent that the device of the invention has numerous advantages, and in particular:

a) it is extremely reliable under all normal operating conditions and also under any abnormal operating condition;

b) it has a very short response time which further improves reliability;

c) it can be used with maximum safety and extreme simplicity even by invalids;

d) it is applicable to any motor vehicle;

e) it can be individually adjusted to suit the vehicle characteristics.

Figure 5:
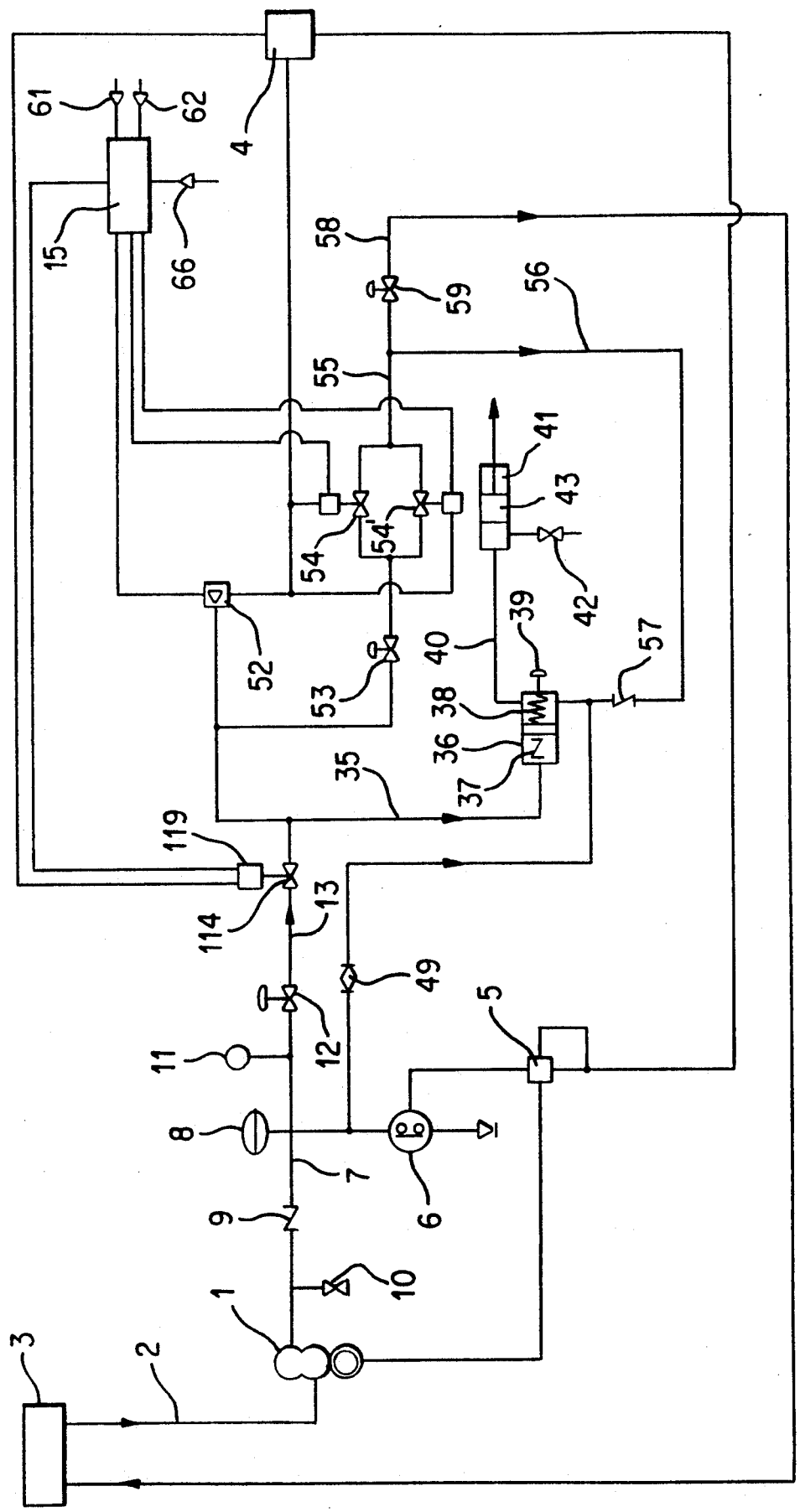
FIG. 5 is a general electrohydraulic schematic of the device according to the invention in a second embodiment.
Figure 6:
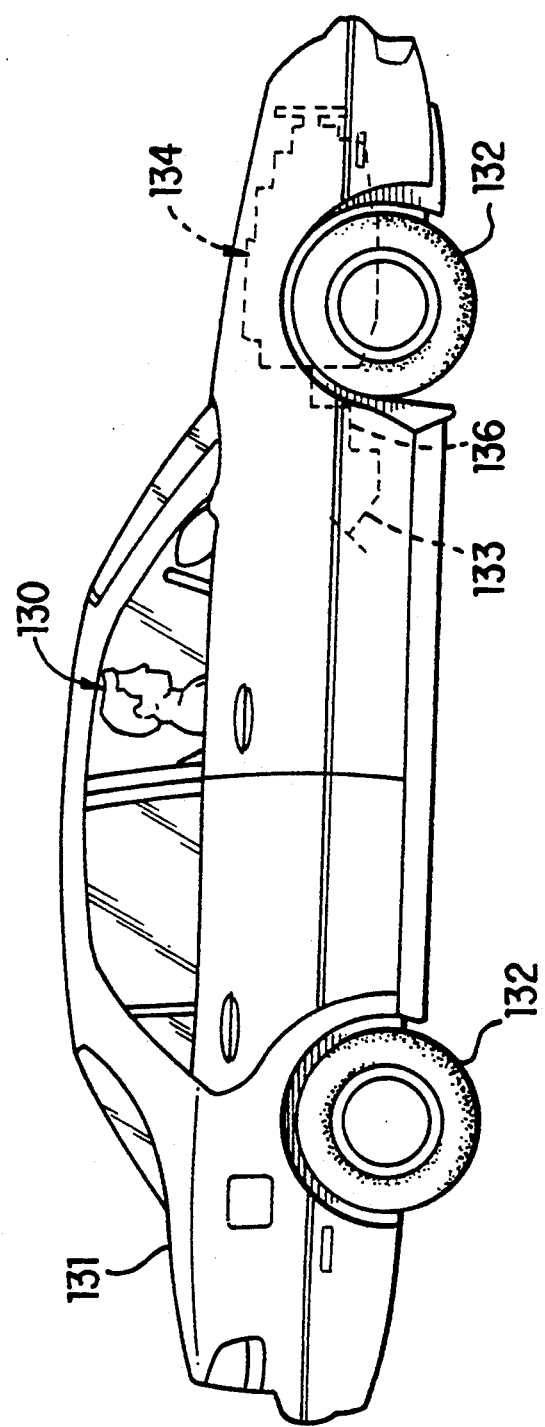
FIG. 6 shows a motor vehicle incorporating the invention.

In the embodiment shown in FIG. 5, the feed line 13 is connected to a needle valve 114, which is directly controlled by the electromagnet 119, in its turn controlled by the control unit 15, and having the exit connected to the line 35 feeding the cylinder 36 and the sensor 46. In this case the accumulator cylinder 51 and the line 50 are eliminated.

In this embodiment, the quick engagement of the cylinder up to skating is controlled by the electronic unit 15 which is programmed so as to provide, according to a memorized sequence, a set of pulses, which cause the quick idle stroke of the plate of the clutch up to reach the skating condition.

This embodiment, which substantially works in the same manner as above described, is more advantageous since, on one hand it requires an absorption of current, necessary to drive the needle valve 114, which is lesser than that required to drive the rod 18 of the slide valve 14, and on the other hand it considerably reduces the quantity of oil moved along the device. This quantity of oil is the lesser, the quicker is the reaction of the clutch, which is an indispensable requirement in particular uses, such as in sport competitions.

Furthermore, this embodiment causes the elimination of the problem of quickly discharging the accumulator 8 in the case of "half forward movement", problem which was present in the previous embodiment and which caused the necessity of simultaneously controlling the two solenoid valves 54 and 54' in the case it was necessary to cause the disengagement of the clutch before the ending of the previous re-engaging phase.

I claim:

1. An electrohydraulic device for controlling clutch engagement in a motor vehicle provided with both an engine and a clutch, including a clutch lever, said clutch controllable by a clutch pedal actuated by a driver of said motor vehicle, comprising:

a) a hydraulic actuator including a piston and a piston rod, wherein said rod is connected to said clutch lever of said motor vehicle;

b) a hydraulic circuit for controlling said actuator via an interceptor means;

c) an electronic control means operatively connected to said interceptor means, to automatically command said interceptor means to both feed said hydraulic actuator thereby releasing said clutch lever, and to enable said hydraulic actuator discharge, when a predetermined engine operating condition exists;

d) at least one solenoid valve connected to the discharge circuit of said hydraulic actuator and caused to open by said electronic control means due to a sequence of pulses related to a R.P.M. of the vehicle engine;

e) a control hydraulic actuator is disposed between said interceptor means and said hydraulic actuator, said control hydraulic actuator being operatively connected to the piston with an opposing spring and means for adjusting a stroke of said hydraulic actuator according to an engagement stroke of the clutch, and with communicating means interposed between the hydraulic circuit connecting said hydraulic actuators and an outer hydraulic circuit and acting when the clutch is engaged.

2. A device according to claim 1 wherein a solenoid valve is inserted into the discharge circuit of said control hydraulic actuator said solenoid valve being in the open state when energized.

3. A device according to claim 1 wherein said interceptor means comprises a slide valve, connected to said hydraulic circuit and connected into the discharge circuit of said control hydraulic actuator, such that said electronic control means is connected to said slide valve and acts to feed the control hydraulic actuator after closing the discharge circuit to cause release of said clutch, and to enable said actuator to discharge after closure of the feed circuit thereby causing clutch re-engagement.

4. A device as claimed in claim 1, wherein the piston of said hydraulic actuator comprise an axial bore which opens into a recess in said piston and is traversed by a cable connecting said clutch lever to the clutch control pedal of said motor vehicle, and a holdfast being tightly receivable in said recess being applied to said cable.

5. A device as claimed in claim 1, wherein said working stroke adjusting means comprises a screw.

6. A device as claimed in claim 1, wherein said piston is connected to the discharge circuit of the solenoid valve via a non-return valve.

7. A device as claimed in claim 1, wherein the hydraulic circuit connecting said hydraulic actuators is directly connected to the feed circuit for its charging on initial installation, and is also provided with a bleed valve.

8. A device as claimed in claim 1, wherein a flow control valve is schematically disposed between said control hydraulic actuator to control the clutch release speed.

9. A device as claimed in claim 8, wherein the flow control valve is of the self-controlled type.

10. A device as claimed in claim 3, wherein the slide valve has a slide valve rod mobile axially within a body between a first and second end position, the first position corresponding to the clutch release phase, the feed circuit is connected to the hydraulic actuator and the discharge circuit is closed, the second position corresponding to the clutch re-engagement phase, the feed circuit is closed and the hydraulic actuator is connected to the discharge circuit.

11. A device as claimed in claim 10, wherein said slide valve is provided with at least one electromagnet for axially moving said slide valve rod.

12. A device as claimed in claim 11, wherein said slide valve is provided with at least one electromagnet for axially moving the rod in one direction and a spring for axially moving the rod in the opposite direction.

13. A device as claimed in claim 10, wherein the body of said slide valve comprises two pairs of ducts for connection to the external lines and opening into a cavity in which the rod axially slides, the latter being provided with two diametrical slots which when said rod is in its two end-of-travel positions connect together one of the two pairs of said ducts after interrupting the connection between the other pair.

14. A device as claimed in claim 13, wherein one duct of each pair houses a first bushing provided with an axial connection bore, whereas the other duct houses a second bushing provided with parametrial grooves, and with a seat for the head of a guide pin for a spring which traverse the corresponding slots in the rod to act on a first or second ball adhering to the respective first or second bushing and housed in the corresponding slots, each of the two end positions of said rod corresponding to the closure of the axial bore of either first or second bushing by the relative ball and the opening of the other bore by the other ball.

15. A device as claimed in claim 14, wherein the distance between the axes of said diametrical slots is less than the distance between the axes of said two pairs of ducts.

16. A device as claimed in claim 14, wherein the annular surface of each bushing is provided with a wide flare.

17. A device as claimed in claim 13, wherein an accumulation member for the operating liquid is connected to the discharge circuit of said control hydraulic actuator.

18. A device as claimed in claim 17, wherein said accumulation member is provided with an adjustment screw.

19. A device as claimed in claim 1, wherein a pressure sensor means is provided in the discharge circuit of the control hydraulic actuator, to activate said electronic control unit when a predetermined pressure is exceeded.

20. A device as claimed in claim 1, wherein the electronic control means comprises an integrator circuit for signals related to the engine rotational speed, in order to generate a sequence of pulses of a frequency related to said rotational speed, to cause the opening of said solenoid valve.

21. A device as claimed in claim 20, wherein said electronic control means comprises a comparator, receiving as one input a signal related to the related to the rotational speed of the engine of said motor vehicle, and receiving as another input a signal related to the rotational speed of the wheels of said motor vehicle, said comparator outputting a pulse signal operatably applied to said solenoid control valves, whereby the frequency of said signal controls said solenoid valves.

22. A device as claimed in claim 21, further comprising a pair of solenoid valves which are opened alternately.

23. A device as claimed in claim 1, further comprising a flow control valve operatively disposed in the discharge circuit of said hydraulic actuator.

24. A device as claimed in claim 23, wherein said flow control valve is self-controlled.

25. A device as claimed in claim 1, further comprising a programmable memory provided in said electronic control means for correlating the controlling pulse frequency for opening said solenoid valves with the r.p.m. of the vehicle engine.

* * * * *